United States Patent [19]

Hasegawa et al.

[11] 4,233,354
[45] Nov. 11, 1980

[54] PRINTED POLYESTER FILMS

[75] Inventors: Kinji Hasegawa, Sagamihara; Yukio Mitsuishi, Machida; Shigeyoshi Masuda, Sagamihara, all of Japan

[73] Assignee: Teijin Limited, Osaka, Japan

[21] Appl. No.: 935,850

[22] Filed: Aug. 22, 1978

[30] Foreign Application Priority Data

Aug. 30, 1977 [JP] Japan .................................. 52-103170

[51] Int. Cl.² ......................... B32B 5/16; B32B 27/36
[52] U.S. Cl. ......................................... 428/195; 8/512; 428/206; 428/207; 428/480; 106/26
[58] Field of Search ............... 428/480, 195, 206, 207; 8/179, 62

[56] References Cited

U.S. PATENT DOCUMENTS

| | | | |
|---|---|---|---|
| 4,091,150 | 5/1978 | Roelofs | 428/480 X |
| 4,104,222 | 8/1978 | Pate et al. | 428/480 X |
| 4,113,898 | 9/1978 | Gardziella et al. | 428/480 X |

OTHER PUBLICATIONS

Japanese Laid-Open Publication 73052/76, Jun. 24, 1976.
Japanese Laid-Open Publication 43507/77, Apr. 5, 1977.

*Primary Examiner*—Thomas J. Herbert, Jr.
*Attorney, Agent, or Firm*—Sherman & Shalloway

[57] ABSTRACT

A printed polyester film comprising
  (I) a biaxially oriented polyester film containing more than 2% by weight to 10% by weight of polyethylene glycol having a molecular weight of 5,000 to 200,000 and a density of 1.390 to 1.410, said film being composed of a polyester in which at least 80% by weight of the entire structural units consists of an ethylene terephthalate unit, and
  (II) a printed layer formed by a printing ink containing a cellulose derivative as a binder, said printed layer being applied to at least a part of the surface of the film (I), and a process for preparation thereof.

9 Claims, No Drawings

PRINTED POLYESTER FILMS

This invention relates to a polyester film having on its surface a well-adhering printed layer formed by a printing ink containing a cellulose derivative as a binder.

It is known that polyester films generally have high crystallinity and high melting points and exhibit excellent properties such as thermal stability, chemical resistance, strength and modulus of elasticity. Because of these properties, they have found extensive use in a variety of fields such as magnetic tapes, photography, metallizing and electrical application. However, polyester films have not been widely used for packaging purposes because they have poor printability and the adhesion of a printing ink is poor at the time of forming a printed layer on the polyester films. Only those inks which contain a much limited range of resins such as saturated polyester resins and polyurethane resins as a binder can be applied. But these inks have poor operability in printing the polyester films. Printing inks containing a cellulose derivative as a binder which are frequently used for printing cellophane have good operability, but their adhesion to polyester films is inferior, resulting in easy peeling of the ink layer applied.

A method of surface treatment, such as corona discharge, of films has previously been performed in an attempt to increase the adhesion of the treated film surface to a printing ink. When a polyester film is simply subjected to a corona discharge treatment, the adhesion of a printing ink to the treated film surface decreases greatly with time, and it is difficult to maintain a high level of adhesive activity over long periods of time.

Some techniques of including polyethylene glycol into polyester films have been suggested in an attempt to increase the adhesion of printing inks containing cellulose derivatives as binders to the polyester films. These conventional techniques have not proved to be entirely satisfactory. For example, Japanese Laid-Open Patent Publication No. 73052/76 states that it is difficult to incorporate polyethylene glycol having a high molecular weight of, say, more than 8000 into polyester, and such a polyester composition does not easily afford a transparent biaxially oriented film. A polyester containing more than 2.0% by weight of polyethylene glycol tends to cause troubles during film formation (see, for example, Japanese Laid-Open Patent Publication No. 43507/77). In order to increase the adhesion of inks, it is desired to use polyethylene glycol having a high molecular weight of more than 8000, or to use as much as more than 2.0% by weight of polyethylene glycol.

It is an object of this invention therefore to provide a printed polyester film useful for packaging having a firmly adhering printed layer formed by a printing ink containing a cellulose derivative as a binder as a result of discovering a biaxially oriented polyester film which is free from the aforesaid defects even when such a high-molecular-weight polyethylene glycol, or such a large amount of polyethylene glycol, is included.

Other objects of the invention will become apparent from the following description.

The present inventors have found that these objects can be met by a biaxially oriented polyester film having a density of 1.390 to 1.410 g/cm$^3$ and composed of a polyester containing an ethylene terephthalate unit is an amount of at least 80% by weight of the entire structural units and containing 2(exclusive) to 10(inclusive)% by weight of polyethylene glycol having a molecular weight of 5,000 to 200,000.

More specifically, this biaxially oriented polyester film is characterized by a crystal size in the direction of the 100 plane, determined by X-ray diffraction, of at least 55 A, preferably at least 60 A, more preferably at least 65 A. The biaxially oriented polyester film, without a surface treatment such as corona discharge, has greatly improved adhesion to printing inks, and excellent transparency and slipperiness.

The invention thus provides a printed polyester film useful for packaging, which comprises (I) the biaxially oriented polyester film described above and (II) a printed layer formed by a printing ink containing a cellulose derivative as a binder, said printed layer being applied to at least a part of the suface of the polyester film (I).

The polyester used in invention is the one in which at least 80% by weight of the entire structural units consists of an ethylene terephthalate unit. Other units which may be included in an amount of up to 20% by weight are, for example, an ethylene isophthalate unit, an ethylene-2,6-naphthalate unit, and a butylene terephthalate unit.

Polyethylene glycol used in this invention has a molecular weight of 5,000 to 200,000, preferably 8,000 to 150,000, more preferably 10,000 to 100,000. Polyethylene glycol is a polyether expressed by the formula HO-(CH$_2$—CH$_2$—O)$_n$H, and those having high molecular weights are called polyethylene oxide. The amount of the polyethylene glycol is from 2% (exclusive) by weight to 10% (inclusive) by weight, preferably 2.1 to 5.0% by weight, based on the polyester.

Polyethylene glycols having a molecular weight of less than 5,000, even when added in considerably large amounts to polyesters, do not serve to give biaxially oriented films (I) having good adhesion to printing inks. On the other hand, when polyethylene glycol having a molecular weight of more than 200,000 is incorporated into a polyester so as to secure sufficiently high adhesion to printing inks, the haze of the resulting biaxially oriented film increases and its transparency is degraded. When the amount of the polyethylene glycol is 2% by weight or less, a biaxially oriented film having a sufficiently high adhesion to printing inks cannot be obtained. If the amount of polyethylene glycol exceeds 10% by weight, the haze of the resulting biaxially oriented film increases, and its transparency is degraded. Moreover, in the latter case, the inherent excellent properties of the polyester film are degraded.

It is surprising that the biaxially oriented polyester film (I) of the invention has a markedly increased adhesion to printing inks without a surface treatment such as corona discharge when it has a density of 1.390 to 1.410 g/cm$^3$, preferably 1.392 to 1.403 g/cm$^3$. The reason for this is not entirely clear. But it is assumed that when a heat-setting treatment to be described hereinbelow is performed in order to obtain a film having a density within the above-specified range (especially when the molecular weight of polyethylene glycol and the heat-setting temperature are high), the polyethylene glycol precipitates as particles on the film surface. In fact, a microscopic observation of the biaxially oriented polyester film (I) shows that elliptic particles having a short axis diameter of 0.05 to 10$\mu$ and a long axis diameter of 0.1 to 50$\mu$, preferably a short axis diameter of 0.05 to 5$\mu$ and a long axis diameter of 0.1 to 20$\mu$, more preferably a short axis diameter of 0.1 to 2$\mu$ and a long axis diameter of 0.5 to 10μ (probably, the deposited polyethylene glycol particles) are formed densely and uniformly along the direction of film stretching. It is due to this surface structure that the film (I) of the invention has a markedly increased adhesion to printing inks. A biaxially oriented polyester film having a density of less than 1.390 g/cm$^3$ has only insufficient adhesion to printing inks because the aforesaid particles are not present on its surface, or are present only in small amounts. On the other hand, a biaxially oriented polyester film having a density of more than 1.410 g/cm$^3$ suffers from a marked deterioration in its inherent mechanical properties.

The adhesion of the film (I) to a printing ink is also superior when it forms a contact angle with water of 25° to 55°, preferably 30° to 48°. Films having a contact angle outside this range are undesirable because of their poor adhesion to printing inks.

In the production of the biaxially oriented film (I) the polyethylene glycol may be incorporated into the polyester at any time before the completion of polymerization for forming the polyester. Conveniently, however, it is added after the ester-interchange step.

According to another embodiment of forming the biaxially oriented film (I) used in this invention, a master polymer containing polyethylene glycol in a high concentration is prepared. It is then diluted with an ordinary polyester which does not substantially contain polyethylene glycol by using a blender so that the desired concentration of polyethylene glycol may be attained. The resulting polymer composition is then subjected to film formation. When the concentration of polyethylene glycol is too high in the production of the master polymer, polyethylene glycol separates from the master polymer, and the polymerization is difficult. The upper limit of the concentration differs depending upon the molecular weight of polyethylene glycol. There is a general tendency that when the molecular weight of polyethylene glycol is higher, it is difficult to prepare a master polymer containing polyethylene glycol in a higher concentration. The suitable concentration of polyethylene glycol in the master polymer is within the range of 4 to 40% by weight, preferably 5 to 25% by weight, more preferably 7.5 to 20% by weight. Preparation of a polyester containing a predetermined amount of polyethylene glycol by mixing such a master polymer with an ordinary polyester containing substantially no polyethylene glycol is believed to be one factor which makes possible the production of a superior quality biaxially oriented polyester film from a polyester containing the high-molecular-weight polyethylene glycol or such a large amount of polyethylene glycol as described hereinabove.

The polyester containing polyethylene glycol may further contain suitable additives such as antioxidants, ultraviolet absorbers, lubricants or pigments.

The biaxially oriented polyester film (I) can be produced, for example, as follows: A polyethylene glycol-containing polyester obtained by adding 4 to 40% by weight, preferably 5 to 25% by weight, more preferably 7.5 to 20% by weight, of polyethylene glycol having a molecular weight of 5,000 to 200,000, preferably 8,000 to 150,000, more preferably 10,000 to 100,000 to a polyester comprising at least 80% by weight, based on the entire structural units, of an ethylene terephthalate unit before the completion of polymerization, and then completing the polymerization is mixed with a substantially polyethylene glycol-free polyester in which at least 80% by weight of the entire structural units consists of an ethylene terephthalate unit so that the content of polyethylene glycol in the final composition becomes more than 2% by weight to 10% by weight, preferably 2.1 to 5.0% by weight. The resulting blend is melt-extruded by a T-die method or an inflation method to form an unstretched film having an inherent viscosity [η] of 0.4 to 10 (measured in an o-chlorophenol solution at 35°). The film is stretched biaxially, and then heat-set. The stretching temperature used at this time may be substantially the same as that used in stretching ordinary polyethylene terephthalate films, but may be varied according to the content of polyethylene glycol. Usually, the stretching temperature is 70° to 130° C., preferably 80° to 120° C. The stretch ratio is not particularly limited. It may be 2.5 to 5.0X, preferably 3.0 to 4.5X, in the machine direction, and 3.0 to 5.0X, preferably 3.0 to 4.5X, in the transverse direction. The heat-setting treatment is carried out at 210° to 250° C., preferably 220° to 245° C., for 1 to 120 seconds, preferably 2 to 60 seconds, so that the biaxially oriented film after the treatment will have a density of 1.390 to 1.410 g/cm$^3$, preferably 1.392 to 1.403 g/cm$^3$.

The biaxially oriented polyester film (I) can be made in varying thickness depending upon the intended uses. Usually, the thickness is from 5μ to 500μ. Thicknesses outside this range may be selected for certain applications.

The printed film of this invention can be produced by forming a layer (II) of a printing ink on a part or the whole of one or both surfaces of the biaxially oriented polyester film (I) described above.

Printing inks that can be used in this invention contain a cellulose derivative such as nitrocellulose, cellulose acetate, methyl cellulose or ethyl cellulose as a binder. In addition to the binder, the printing inks also contain a natural resin such as rosin, or a synthetic resin such as a phenolic or alkyd resin. Solvents included in the printing inks are, for example, methyl alcohol, ethyl alcohol, butyl alcohol, acetone, methyl acetate, ethyl acetate, toluene, and xylene. Inorganic or organic pigments or dyes may be incorporated according to the desired color.

The biaxially oriented film (I) can be printed by the same method as in printing cellophane to provide the printing ink layer (II) having sufficiently high adhesion to the film. In other words, even without a prior surface treatment such as corona discharge, the biaxially oriented film (I) of the invention can be printed with a printing ink containing a cellulose derivative as a binder. Printing can be performed by any desired method such as a gravure roll method, a kiss roll method or a bar coat method.

If desired, the printed film of the invention can be subjected to a surface treatment such as ultraviolet irradiation, electron beam irradiation or corona discharge. It is also possible, if desired, to laminate a low-melting polymer such as polypropylene or polyethylene to the printed surface of the film, and use the laminated product as a packaging material. A vinylidene chloride resin coating may be formed on the surface of the film of the invention to impart gas-barrier property.

The following Examples and Comparative Examples are given to illustrate the invention more specifically.

The various properties given in these examples were measured by the following methods.

1. Tensile strength

A film sample, 10 cm long and 1 cm wide, was pulled at a rate of 100%/min. at room temperature and a relative humidity of 65% by Tensilon UTM-III-500 (made by Toyo Baldwin Co., Ltd.). A load-elongation chart was prepared from the results of this test, and the elongation at break and the strength at break were determined from the chart.

Elongation at break

The elongation (%) of the sample at break based on the original length.

Strength at break

The force required to break the film at room temperature is expressed in terms of the force (kg/mm$^2$) exerted per unit cross-sectional area of the original film sample.

2. Density

Measured in a mixture of n-heptane and carbon tetrachloride at 25° C. by a floating method.

3. Contact angle with water.

A film sample was allowed to stand for a day and night in an atmosphere kept at a temperature of 20° C. and a relative humidity of 60%, and then under the same temperature humidity conditions, the angle of contact of the film with a drop of distilled water having a diameter of 1 to 2 mm was measured by using a goniometer-type contact angle measuring instrument (made by Elma Kogaku Co., Ltd.)

4. Haze (the degree of cloudiness)

Measured in accordance with JIS K6714 by using an integrating sphere-type HTR meter (made by Nippon Seimitsu Kogaku Kabushiki Kaisha).

5. Adhesion of printing ink (1) Tape peeling

A 19 mm-wide electrical insulation tape (Scotch #56, a product of 3M, U.S.A.) was pushed against the ink coated surface of a film. A T-peeling test was performed at a speed of 1,000 mm/min. by using a tensile tester, and the peel strength of the ink layer was determined.

(2) Crumpling

The ink coated surface of a film was strongly crumpled by both hands ten times, and the degree of peeling of the ink layer was observed.

(3) Scratching

The ink coated surface of a film was scratched by a finger nail on a glass plate, and the degree of peeling was observed.

6. Coefficient of friction

The coefficient of static friction and the coefficient of dynamic friction were measured under a load of 200 g and a sliding speed of 15 cm/min. by using a TKK-type friction coefficient measuring device (a product of Tester Sangyo K.K.). Prior to the measurment, the sample film was allowed to stand for a day and night in an atmosphere kept at a temperature of 20° C. and a relative humidity of 65%.

$$\mu = f/p$$

$\mu$: the coefficient of friction
f: the frictional force
p: the load exerted on the film 7. Boiling water treatment A film sample was put into boiling water at 100° C. under atmospheric pressure, and boiled for 45 minutes. The sample was withdrawn, air dried, and subjected to the adhesion test described in section 5 above.

8. Surface configuration

A metal was vacuum-deposited on the surface of a film sample, and observed by a differential interference microscope (a product of Nikon Co., Ltd.) by a reflection illumination at a magnification of 500 X to determine the presence or absence of elliptical particles on the surface.

9. Crystal size

The half width of a sample was measured by using an X-ray diffraction device. The crystal size of the sample is calculated in accordance with the following equation.

$$D = 0.9\lambda/B \cos \theta$$

wherein
D is the crystal size in Å,
B is the half width, and
$\lambda$ is the K$_\alpha$ ray (1.54 Å) of copper.

EXAMPLES 1 TO 7 AND COMPARATIVE EXAMPLES 1 TO 3

Polyethylene terephthalate was prepared by polymerization in a customary manner. Before the completion of polymerization, 20% by weight of polyethylene glycol having a molecular weight of 4000, 6000, 11000, 20000, 150000, or 300000 was mixed. Then, in a customary manner, the polymer was extruded from a polymerization reactor, and cut to obtain a master polymer containing 20% by weight of the polyethylene glycol.

For comparison, polyethylene terephthalate (homopolymer) was prepared by a customary method.

The master polymer was mixed with the polyethylene terephthalate so as to adjust the content of polyethylene glycol to each of the values indicated in Table 1. The mixture was melt-extruded in a customary manner into a film form. The resulting unstretched film was stretched to 3.5 times in the machine direction at 90° C., and to 3.8 times in the transverse direction at 100° C., and then heat-set at 230° C. for 30 seconds. The resulting film had a thickness of 12$\mu$.

A layer of an ink for cellophane (CL-S 709 White, a trademark for a product of Dainippon Ink and Chemicals, Inc.) containing a cellulose derivative as a binder was applied to one surface of the stretched film to a thickness of about 2$\mu$, and dried at 80° C. for 1 minute. The product was tested for the adhesion of the printing ink either directly or after it was subjected to boiling water treatment. The results are shown in Table 1.

Table 1 demonstrates that the printed film of this invention has superior adhesion to the printing ink, and even after the boiling water treatment, the adhesion of the printing ink is sufficiently high.

Separately, a 50 $\mu$-thick polypropylene film was dry-laminated onto the printed layer of the film of this invention by using a polyurethane-type adhesive. The adhesion of the printed layer was good, and even after the boiling water treatment, no peeling was seen to occur between the base film and the ink layer.

TABLE 1

| | | Example 1 | Example 2 | Example 3 | Example 4 | Example 5 | Example 6 | Example 7 | Comparative Example (polyethylene terephthalate) | Comparative Example 2 | Comparative Example 3 |
|---|---|---|---|---|---|---|---|---|---|---|---|
| Polyethylene glycol | Molecular weight | 6,000 | 11,000 | 20,000 | 20,000 | 20,000 | 20,000 | 150,000 | — | 4,000 | 300,000 |
| | Content (wt. %) | 2.5 | 2.5 | 2.2 | 2.5 | 5.0 | 7.5 | 2.5 | — | 2.5 | 2.5 |
| *Density of film (g/cm$^3$) | | 1.399 | 1.398 | 1.398 | 1.397 | 1.396 | 1.394 | 1.398 | 1.399 | 1.398 | 1.398 |
| *Contact angle (°) | | 37 | 37 | 42 | 38 | 37 | 35 | 36 | 67 | 57 | 35 |
| *Haze of film (%) | | 2.4 | 2.5 | 2.2 | 2.7 | 3.2 | 3.9 | 3.8 | 2.5 | 2.5 | 5.2 |
| *Break elongation (%) (1) | | 110 | 116 | 105 | 127 | 109 | 105 | 115 | 128 | 125 | 103 |
| *Break strength (kg/mm$^2$) (1) | | 20.1 | 22.1 | 21.5 | 22.7 | 20.5 | 18.6 | 21.8 | 22.5 | 21.9 | 20.8 |
| *Coefficient of friction static/dynamic | | 0.43/0.46 | 0.41/0.45 | 0.43/0.45 | 0.37/0.43 | 0.36/0.43 | 0.35/0.41 | 0.36/0.41 | 0.60/0.66 | 0.62/0.65 | 0.30/0.42 |
| *Surface configuration (2) | | YES | YES | YES | YES | YES | YES | YES | NO | NO | YES |
| Adhesion of printing ink | Tape peel strength | **400 | **520 | 450 | **520 | **530 | **540 | **510 | 3 | 80 | **520 |
| | Crumpling (3) | O | O | O | O | O | O | O | X | Δ | O |
| | Scratch (3) | O | O | O | O | O | O | O | X | Δ | O |
| Adhesion Of printing Ink after the boiling water treatment | Tape peel strength | 250 | 340 | 450 | 440 | 420 | 450 | 390 | 2 | 20 | 430 |
| | Crumpling (3) | O | O | O | O | O | O | O | X | X | O |
| | Scratch (3) | O | O | O | O | O | O | O | X | X | O |

(1) The direction of pulling was the machine direction.
(2) YES means that elliptical particles are present, and NO means that they are not present
(3) O represents good; Δ, fair; X, poor.
*These are the properties of the base polyester film (the biaxially oriented film before printing).
**These values mean that the ink layer could not be peeled off.

EXAMPLES 8 AND 9 AND COMPARATIVE EXAMPLES 4 AND 5

Using the master polymer containing 20% by weight of polyethylene glycol having a molecular weight of 20,000 shown in Examples 3 to 6, biaxially stretched films containing 2.5% by weight of polyethylene glycol were prepared. They were heat-set at varying temperatures (200° to 252° C.) for 2 seconds to form films having the densities shown in Table 2. The films obtained had a thickness of 12μ.

One surface of each of these films was printed with an ink for cellophane in the same way as in Examples 1 to 7 and Comparative Examples 1 to 3. The results of measurements are shown in Table 2.

Table 2 demonstrates that the printed films of the invention, either as such or after the boiling water treatment, permit good adhesion of the printing ink layer.

Separately, a 50 μ-thick polypropylene film was dry-laminated on the printed layer of each of these films of the invention by a polyurethane-type adhesive. These laminated films showed good adhesion even after the boiling water treatment, and no peeling was seen to occur between the base film and the ink layer.

TABLE 2

| | | Example 8 | Example 9 | Comparative Example 4 | Comparative Example 5 |
|---|---|---|---|---|---|
| Polyethylene glycol | Molecular weight | 20,000 | 20,000 | 20,000 | 20,000 |
| | Content (wt. %) | 2.5 | 2.5 | 2.5 | 2.5 |
| Heat-setting temperature (°C.) | | 230 | 240 | 200 | 252 |
| *Density of film (g/cm$^3$) | | 1.395 | 1.402 | 1.390 | 1.404 |
| *Contact angle with water (degrees) | | 41 | 35 | 45 | 29 |
| *Haze of film (%) | | 2.6 | 2.3 | 2.9 | 2.0 |
| *Break elongation (1) (%) | | 112 | 113 | 97.6 | 115 |
| *Break strength (1) (kg/mm$^2$) | | 22.5 | 18.5 | 25.3 | 14.1 |
| *Coefficient of friction (static/dynamic) | | 0.41/0.44 | 0.37/0.43 | 0.41/0.52 | 0.36/0.42 |
| Adhesion of printing ink | Tape peel strength | **520 | **530 | 130 | 250 |
| | Crumpling (3) | O | O | Δ | Δ |
| | Scratch (3) | O | O | Δ | Δ |
| Adhesion of | Tape peel strength | 420 | 460 | 40 | 130 |

TABLE 2-continued

|  |  | Example 8 | Example 9 | Comparative Example 4 | Comparative Example 5 |
|---|---|---|---|---|---|
| printing ink after the boiling water treatment | Crumpling (3) | O | O | X | Δ |
|  | Scratch (3) | O | O | X | Δ |

(1), (3), * and ** are the same as the footnote to Table 1.

EXAMPLES 10 TO 14 AND COMPARATIVE EXAMPLES 6 AND 7

Polyethylene terephthalate was prepared by polymerization in a customary manner, and 20% by weight of polyethylene glycol having a molecular weight of 20,000 was added before the completion of polymerization. Then, the polymer was discharged from the polymerization reactor and cut in a customary manner to obtain a master polymer containing 20% by weight of polyethylene glycol. Polyethylene terephthalate homopolymer was mixed with the master polymer so that the content of polyethylene glycol in the final mixture became 2.1% by weight. The mixture was melt-extruded into a film form in a customary manner, and the resulting unstretched film was stretched to 3.5 times in the machine direction at 90° C., and to 3.8 times in the transverse direction at 100° C. The stretched film was heat-set for 30 seconds at each of the temperatures shown in Table 3. The resulting films had a thickness of 12μ.

A printed layer of an ink for cellophane containing a cellulose derivative as a binder was formed on one surface of each of the films to a thickness of about 2μ in the same way as in Examples 1 to 7 and Comparative Examples 1 to 3, and dried at 80° C. for 1 minute. The resulting laminated sheet was tested for the adhesion of the printing ink either directly or after the boiling water treatment. The results are shown in Table 3.

Table 3 demonstrates that the printed films of the invention had superior adhesion to the printing ink.

TABLE 3

|  |  | Example 10 | Example 11 | Example 12 | Example 13 | Example 14 | Comparative Example 6 | Comparative Example 7 |
|---|---|---|---|---|---|---|---|---|
| Polyethylene glycol | Molecular weight | 20,000 | 20,000 | 20,000 | 20,000 | 20,000 | 20,000 | 20,000 |
|  | Content (wt. %) | 2.1 | 2.1 | 2.1 | 2.1 | 2.1 | 2.1 | 2.1 |
| Heat-setting temperature (°C.) | | 210 | 215 | 225 | 230 | 245 | 200 | 190 |
| *Density of film (g/cm$^3$) | | 1.393 | 1.394 | 1.395 | 1.396 | 1.401 | 1.388 | 1.382 |
| *Contact angle (°) | | 40 | 39 | 35 | 34 | 32 | 49 | 55 |
| Crystal size in the 100 plane (A) | | 56 | 62 | 67 | 71 | 78 | 52 | 47 |
| Adhesion of printing ink | Tape Peel strength | 480 | **520 | **530 | **540 | **540 | 170 | 80 |
|  | Crumpling (3) | O | O | O | O | O | Δ | X |
|  | Scratch (3) | O | O | O | O | O | Δ | X |

(3), * and ** are the same as the footnote to table 1.

What we claim is:

1. A printed polyester film comprising
   (I) a biaxially oriented polyester film which is a blend of (1) a polyethylene glycol containing polyester with (2) a polyester comprising at least 80% by weight, based on the entire structural units, of ethylene terephthalate units, said blend containing from 2.1% to 5% by weight of the blend of said polyethylene glycol having a molecular weight in the range of from 10,000 to 100,000 and having a density in the range of from 1.392 g/cm$^3$ to 1.403/cm$^3$, and
   (II) a printed layer formed by a printing ink containing a cellulose derivative as a binder, said printed layer being applied to at least a part of the surface of the film (I).

2. The printed polyester film of claim 1, wherein the biaxially oriented polyester film (I) has a crystal size in the direction of the 100 plane, determined by X-ray diffraction, of at least 65 angstroms.

3. The printed polyester film of claim 1 in which the printing ink contains nitrocellulose, cellulose acetate, methyl cellulose or ethyl cellulose as a binder.

4. A printed polyester film comprising
   (I) a biaxially oriented polyester film having a density of from 1.390 to 1.410 g/cm$^3$ which is prepared by mixing a polyethylene glycol-containing polyester master polymer with a polyester comprising at least 80% by weight, based on the entire structural units, of an ethylene terephthalate unit so that the content of polyethylene glycol in the final mixture becomes from 2.1% to 5% by weight, said master polymer being obtained by adding 7.5 to 20% by weight of polyethylene glycol having a molecular weight of 10,000 to 100,000 to a polyester comprising at least 80% by weight, based on the entire structural units of an ethylene terephthalate unit before the completion of the polymerization and then completing the polymerization; melt-extruding the resulting mixture into a film form; stretching the film at a temperature of 80° to 120° C. to 3.0 to 4.5 times in the machine direction and to 3.0 to 4.5 times in the transverse direction; and heat-setting the resulting stretched film at a temperature of 220° to 245° for 2 to 60 seconds, and
   (II) a printed layer formed by a printing ink containing a cellulose derivative as a binder, said printed layer being applied to at least a part of the surface of the film (I).

5. The printed polyester film of claim 4 wherein the biaxially oriented polyester film (I) has a density of from 1.392 g/cm$^3$ to 1.403 g/cm$^3$.

6. The printed polyester film of claim 5 wherein the biaxially oriented polyester film (I) has a crystal size in the direction of the 100 plane, determined by X-ray diffraction, of at least 65 angstroms.

7. The printed polyester film of claim 6 which the printing ink contains nitrocellulose, cellulose acetate, methyl cellulose or ethyl cellulose as a binder.

8. A printed polyester film comprising
(I) a biaxially oriented polyester film having a density of from 1.390 g/cm$^3$ to 1.410 g/cm$^3$ and a crystal size in the direction of the 100 plane, determined by X-ray diffraction, of at least 55 angstroms and comprising a blend of (1) a polyethylene glycol-containing polyester master batch with (2) a polyester comprising at least 80% by weight, based on the entire structural units, of ethylene terephthalate units, wherein the polyethylene glycol of the master batch has a molecular weight of 10,000 to 100,000, the polyester of the master batch comprises at least 80% by weight, based on the entire structural units, of an ethylene terephthalate unit, the amount of the polyethylene glycol in the master batch is from 4 to 40% by weight and the total amount of the polyethylene glycol in the blend of (1) and (2) is more than 2% by weight but not more than 10% by weight, and
(II) a printed layer formed by a printing ink containing a cellulose derivative as a binder, said printed layer being applied to at least a part of the surface of the film (I).

9. The printed polyester film of claim 8 wherein the biaxially oriented polyester film has a crystal size in the direction of the 100 plane, determined by X-ray diffraction, of at least 65 angstroms, and has a density of from 1.392 to 1.403 g/cm$^3$.

* * * * *